(12) United States Patent
Okuyama et al.

(10) Patent No.: US 12,459,573 B2
(45) Date of Patent: Nov. 4, 2025

(54) VEHICLE SIDE BODY STRUCTURE

(71) Applicant: Mazda Motor Corporation, Hiroshima (JP)

(72) Inventors: Tomohito Okuyama, Hiroshima (JP); Kyohei Yukita, Hiroshima (JP); Isamu Kizaki, Hiroshima (JP); Kaori Suzuki, Hiroshima (JP); Takuto Fukushima, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 382 days.

(21) Appl. No.: 18/126,485

(22) Filed: Mar. 27, 2023

(65) Prior Publication Data
US 2023/0347983 A1  Nov. 2, 2023

(30) Foreign Application Priority Data

Apr. 4, 2022 (JP) ................... 2022-062459

(51) Int. Cl.
*B62D 25/02* (2006.01)
*B62D 21/15* (2006.01)
*B60J 5/04* (2006.01)
*B62D 25/04* (2006.01)

(52) U.S. Cl.
CPC ......... *B62D 21/157* (2013.01); *B62D 25/025* (2013.01); *B60J 5/042* (2013.01); *B62D 25/04* (2013.01)

(58) Field of Classification Search
CPC .... B62D 25/025; B62D 25/04; B62D 21/157; B60J 5/042; B60J 5/0422; B60J 5/0423; B60J 5/0427; B60J 5/0429; B60J 5/0448; B60J 5/0458; B60J 5/0456; B60J 5/0461
USPC ..... 16/82, 83; 296/187.12, 29, 146.6, 23.01, 296/3, 193.07, 204
See application file for complete search history.

(56) References Cited

U.S. PATENT DOCUMENTS

| | | | | |
|---|---|---|---|---|
| 3,819,228 A | * | 6/1974 | Cornacchia | B62D 25/04 292/DIG. 65 |
| 5,029,934 A | * | 7/1991 | Schrader | B60J 5/0458 49/502 |
| 7,762,620 B2 | * | 7/2010 | Yao | B62D 21/157 296/203.03 |
| 8,661,617 B1 | | 3/2014 | Kim | |

* cited by examiner

*Primary Examiner* — Dennis H Pedder
(74) *Attorney, Agent, or Firm* — XSENSUS LLP

(57) ABSTRACT

In a vehicle side body structure, when a force that deforms a side door inward in a vehicle width direction acts on the side door, a second engagement section enters a clearance in the vehicle width direction of the side door, a first engagement section and the second engagement section respectively engage with a first engaged section and a second engaged section, and an engagement structure bent with the first engagement section serving as a fulcrum, so as to prevent the side door from flipping up.

20 Claims, 9 Drawing Sheets

VEHICLE SIDE BODY STRUCTURE

CROSS REFERENCE TO RELATED APPLICATIONS

The present application claims priority to Japanese application number 2022-062459 filed in the Japanese Patent Office on Apr. 4, 2022, the entire contents of which being incorporated herein by reference.

TECHNICAL FIELD

The present disclosure relates to a vehicle side body structure.

BACKGROUND ART

A vehicle side body structure generally includes: a side door that is openably/closably attached to a vehicle body by a hinge; and a side sill reinforcement that is provided to an end portion on each of right and left sides in a vehicle width direction of a vehicle floor panel and on an inner side in the vehicle width direction of the side door, so as to oppose a lower portion of the side door. Such a side body structure is designed to protect an occupant in a survival space in a cabin by keeping the survival space as large as possible when a collision with another vehicle occurs and an impact load acts on the vehicle side door from a lateral side, for example.

As the related art, the following side body structure has been known. The side body structure is configured that, due to the above-described impact load from the lateral side, the side door and the side sill reinforcement are deformed together while the side door abuts the side sill reinforcement. Such a side body structure is devised that, when receiving the impact load from the lateral side, the side door keeps abutting the side sill reinforcement, so as to disperse the impact load throughout the vehicle via the side door and the side sill reinforcement. In this way, safety of the occupant in the cabin is maintained as much as possible.

However, there is a possibility that, when the side door receives the impact load from the lateral side, a lower end portion of the side door flips up, and the side door moves away from the side sill reinforcement. In this case, the side door enters the cabin over the side sill reinforcement.

To handle such a problem, for example, the following side body structure is disclosed in Patent document 1. In the side body structure, when the side door receives the impact load from the lateral side, a projected section such as a catcher pen that is provided in the side door is fitted into a hole that is provided in the side sill reinforcement. Since the projected section on the side door side is fitted into the hole on the side sill reinforcement side, the side door remains abutting the side sill reinforcement. Thus, the side door does not enter the cabin over the side sill reinforcement.

PRIOR ART DOCUMENTS

Patent Documents

[Patent Document 1] US8, 661, 617B

SUMMARY

Problems to be Solved

However, in the structure disclosed in Patent document 1, when the side door receives the large impact load from the lateral side, the projected section on the side door side is once fitted into the hole on the side sill reinforcement side. Thereafter, when the lower end portion of the side door is deformed to flip up further significantly, the projected section is possibly detached from the hole, and the side door possibly enters the cabin over the side sill reinforcement.

In view of the above, one or more embodiments are directed to providing a vehicle side body structure that is configured to suppress a lower end portion of a side door from flipping up even when the side door receives a large impact load from a lateral side.

Means for Solving the Problem

In order to achieve the above and other purposes, the one or more embodiments is configured as follows.

A vehicle side body structure includes: a side door; and a side sill reinforcement provided on an inner side in a vehicle width direction of the side door to oppose a lower portion of the side door. The side sill reinforcement includes a first engaged section that extends in a vehicle longitudinal direction; and a second engaged section below the first engaged section and on an inner side in the vehicle width direction of the first engaged section with a clearance being provided from the first engaged section. The side door includes a first engagement section and a second engagement section on an outer side in the vehicle width direction of the side sill reinforcement, the first engagement section and the second engagement section extending toward the clearance in a closed state of the side door and are away from each other on an outer side in the vehicle width direction and the inner side in the vehicle width direction, respectively, When a force that deforms the side door toward the inner side in the vehicle width direction acts on the side door, in a state where the second engagement section enters the clearance by following the deformation in the vehicle width direction of the side door and the first engagement section and the second engagement section respectively engage with the first engaged section and the second engaged section, the engagement means is bent with the first engagement section being a fulcrum, so as to prevent the side door from flipping up.

Accordingly, when the force that deforms the side door toward the inner side in the vehicle width direction acts on the side door, in the state where the second engagement section of the engagement means, which is provided to the side door, enters the clearance between the first engaged section and the second engaged section of the engaged means, which is provided to the side sill reinforcement, by following the deformation in the vehicle width direction of the side door and the first engagement section and the second engagement section of the engagement means respectively engage with the first engaged section and the second engaged section, the engagement means is bent with the first engagement section being the fulcrum, so as to prevent the side door from flipping up. Thus, even when the side door receives a large impact load from a lateral side, the second engagement section is held without being detached from the clearance. Therefore, it is possible to suppress a lower end portion of the side door from flipping up.

An outer end portion in the vehicle width direction of the first engaged section may be located on the outer side in the vehicle width direction of an outer end portion in the vehicle width direction of the second engaged section.

Accordingly, the outer end portion in the vehicle width direction of the first engaged section is located on the outer side in the vehicle width direction of the outer end portion in the vehicle width direction of the second engaged section. Thus, even when the side door receives the large impact load from the lateral side, the outer end portion in the vehicle width direction of the first engaged section suppresses rotation of the engagement means. Therefore, it is possible to further suppress the lower end portion of the side door from flipping up.

The side sill reinforcement may have a side sill reinforcement body and an engaged member that is fixed onto the side sill reinforcement body. The engaged member may form the first engaged section, and an upper surface of the side sill reinforcement body may form the second engaged section.

Accordingly, the engaged member that is fixed onto the side sill reinforcement body forms the first engaged section, and the upper surface of the side sill reinforcement body forms the second engaged section. Thus, even when the side door receives the large impact load from the lateral side, the second engagement section is held without being detached from the clearance between the engaged member and the upper surface of the side sill reinforcement body. Therefore, it is possible to suppress the lower end portion of the side door from flipping up.

The side door may include a bottom surface that opposes the upper surface of the side sill reinforcement body, and the engagement means may be fixed to the bottom surface of the side door.

Accordingly, the engagement means is fixed to the bottom surface of the side door. Thus, even when the side door receives the large impact load from the lateral side, energy of the impact load is transmitted to the side sill reinforcement via the side door and the engagement means. As a result, such energy is less likely to be transmitted to the body structure other than the side door and the side sill reinforcement. Therefore, it is possible to suppress deformation of the body structure other than the side door and the side sill reinforcement.

The engagement means may include: a second portion that extends in the vehicle width direction and includes the second engagement section on the inner side in the vehicle width direction; a first portion that extends upward from an outer end portion in the vehicle width direction of the second portion and cooperates with the second portion to form the first engagement section on a boundary between the first portion and the second portion; and a third portion that is integrally coupled to an upper end of the first portion and extends inward in the vehicle width direction from the upper end of the first portion. A support member may be fixed to the side door, and may include a support member upper surface that opposes the bottom surface of the side door, and the third portion may be fixed to the support member upper surface of the support member.

Accordingly, the third portion of the engagement means is fixed to the support member upper surface of the support member fixed to the side door. Thus, even when the side door receives the large impact load from the lateral side, stress concentration on the side door, to which the third portion is attached via the support member, is suppressed. As a result, the engagement means and the support member are not detached from the side door, and the second portion including the second engagement section of the engagement means is stably held in the clearance between the upper surface of the side sill reinforcement body and the engaged member. Therefore, it is possible to suppress the lower end portion of the side door from flipping up.

The support member may be formed by bending a metal plate, and the support member may include a support member reinforced section that is formed to be curved or bent upward or downward when seen in the vehicle width direction.

Accordingly, the support member includes the support member reinforced section that is formed to be curved or bent upward or downward when seen in the vehicle width direction. Thus, even when the side door receives the large impact load from the lateral side, the side door, to which the support member is attached, is further suppressed from flipping up. As a result, the support member is not detached from the side door, and the second portion of the engagement means is stably held in the clearance between the upper surface of the side sill reinforcement body and the engaged member. Therefore, it is possible to suppress the lower end portion of the side door from flipping up.

A coupled section between the upper surface and an outer surface of the side sill reinforcement body may be provided with a curved corner section that is curved downward from the upper surface toward the outer surface, and an inner end portion in the vehicle width direction of the second portion of the engagement means may be configured to be guided to the inner side in the vehicle width direction along the upper surface of the side sill reinforcement body while contacting the curved corner section during deformation of the side door.

Accordingly, the coupled section between the upper surface and the outer surface of the side sill reinforcement body is provided with the curved corner section that is curved downward from the upper surface toward the outer surface. Thus, even when the side door receives the large impact load from the lateral side, the inner end portion in the vehicle width direction of the second portion of the engagement means is easily guided to the inner side in the vehicle width direction along the upper surface of the side sill reinforcement body.

The engaged member may include a front end portion and a rear end portion in the vehicle longitudinal direction, and the front end portion and the rear end portion may be fixed to one of or both of the upper surface and the outer surface of the side sill reinforcement body.

Accordingly, the front end portion and the rear end portion of the engaged member are fixed to one of or both of the upper surface and the outer surface of the side sill reinforcement body. Thus, even when the side door receives the large impact load from the lateral side, the stress concentration on the side sill reinforcement body, to which the engaged member is attached, is suppressed. Thus, the engaged member is not detached from the side sill reinforcement body, and the second portion of the engagement means is stably held in the clearance between the upper surface of the side sill reinforcement body and the engaged member. Therefore, it is possible to suppress the lower end portion of the side door from flipping up.

The engaged member may be formed by bending a metal plate, and the engaged member may include an engaged member reinforced section that is formed to be curved or bent upward or downward when seen in the vehicle width direction.

Accordingly, the engaged member includes the engaged member reinforced section that is formed to be curved or bent upward or downward when seen in the vehicle width direction. Thus, even when the side door receives the large impact load from the lateral side, the side sill reinforcement body, to which the engaged member is attached, is further suppressed from flipping up. As a result, the engaged member is not detached from the side sill reinforcement body, and the second portion of the engagement means is stably held in the clearance between the upper surface of the side sill reinforcement body and the engaged member. Therefore, it is possible to suppress the lower end portion of the side door from flipping up.

The side sill reinforcement body may have sufficient rigidity to prevent the deformed engagement means from being pulled out of the clearance during the deformation of the side door.

According to this configuration, the side sill reinforcement body has the sufficient rigidity to prevent the deformed engagement means from being pulled out of the clearance during the deformation of the side door. Thus, even when the side door receives the large impact load from the lateral side, the upper surface of the side sill reinforcement body with the sufficient rigidity and the engaged member can stably hold the deformed engagement means. Therefore, it is possible to suppress the lower end portion of the side door from flipping up.

A side door reinforced section may be attached to the lower portion of the side door from the outer side in the vehicle width direction.

According to this configuration, the side door reinforced section is attached to the lower portion of the side door from the outer side in the vehicle width direction. Thus, even when the side door receives the large impact load from the lateral side, the side door is less likely to be deformed easily. Therefore, it is possible to suppress the lower end portion of the side door from flipping up.

A B pillar may be arranged behind the side door in the vehicle longitudinal direction, an impact bar that is located above the engagement means and is inclined downward from front toward rear in the vehicle longitudinal direction may be attached to the side door from an outer side in the vehicle width direction, and between the engagement means and the B pillar, a coupling reinforced member that couples the impact bar and the lower portion of the side door vertically may be attached from the outer side in the vehicle width direction.

According to this configuration, between the engagement means and the B pillar arranged behind the side door in the vehicle longitudinal direction, the coupling reinforced member that couples the impact bar attached to the side door and the lower portion of the side door vertically is attached from the outer side in the vehicle width direction. Thus, even when the side door receives the large impact load from the lateral side, the side door is less likely to be deformed easily. Therefore, it is possible to suppress the lower end portion of the side door from flipping up.

A crossmember may be attached to a lower portion of the vehicle, the crossmember extending inward in the vehicle width direction from the side sill reinforcement in a manner to be located at a center in the vehicle longitudinal direction of the side door, and the engagement means may be arranged between the crossmember and the B pillar in the vehicle longitudinal direction.

According to this configuration, the engagement means is arranged between the crossmember, which extends inward in the vehicle width direction from the side sill reinforcement, and the B pillar in the vehicle longitudinal direction. Thus, even when the side door receives the large impact load from the lateral side, the side door is less likely to be deformed easily. Therefore, it is possible to suppress the lower end portion of the side door from flipping up.

The side sill reinforcement may include a cover that covers the engaged means, and strength of the engagement means and the cover may be determined such that the engagement means can break through the cover during deformation of the side door.

According to this configuration, the strength of the engagement means and the cover is determined such that the engagement means can break through the cover during deformation of the side door. Thus, when the side door receives the impact load from the lateral side, the second engagement section of the engagement means reliably breaks through the cover and enters the clearance between the first engaged section and the second engaged section of the engaged means.

In a closed state of the side door, the engagement means may separate from the cover to an outer side in the vehicle width direction when the side door is not deformed.

According to this configuration, In the closed state of the side door, the engagement means separates from the cover to the outer side in the vehicle width direction when the side door is not deformed. Thus, design of the side sill reinforcement is held except for a case where the side door receives the impact load from the lateral side and the second engagement section of the engagement means breaks through the cover.

[Advantages]

Therefore, the vehicle side body structure according to one or more embodiments may suppress the lower end portion of the side door from flipping up even when the side door receives the large impact load from the lateral side.

DETAILED DESCRIPTION

A description will hereinafter be made on an embodiment with reference to the accompanying drawings.

[Overall Configuration]

Figure 1:
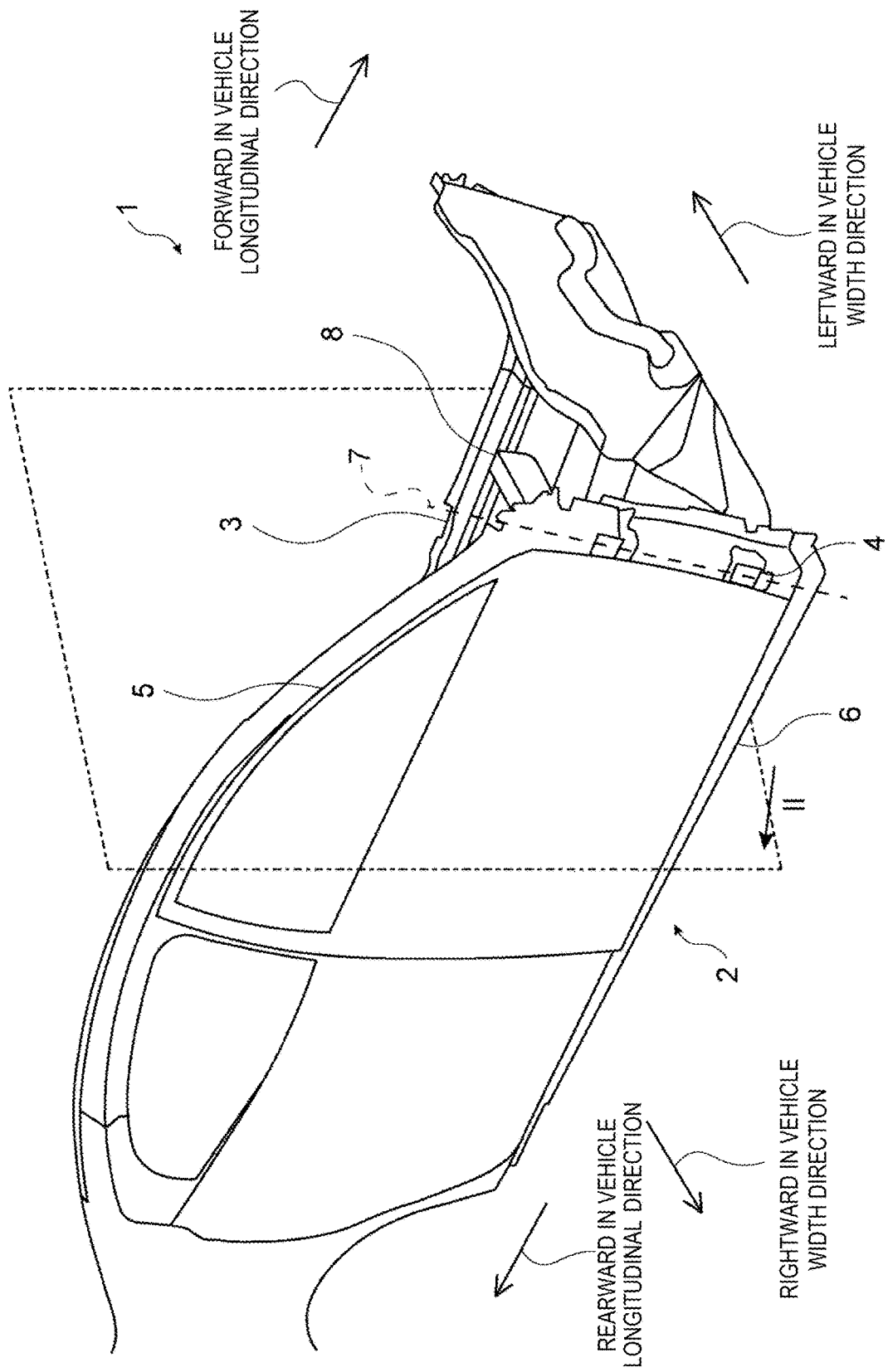
FIG. 1 is a perspective view of a vehicle body structure according to an embodiment.

FIG. 1 is a perspective view of a body structure 1 of a vehicle according to the embodiment. As illustrated in FIG. 1, the body structure 1 includes: a side body structure 2 that is located on a right side and a left side in a vehicle width direction when the body structure 1 is seen forward in a vehicle longitudinal direction from the rear in the vehicle longitudinal direction; and a floor panel 3 that is arranged on an inner side in the vehicle width direction of the side body structure 2. FIG. 1 only illustrates the side body structure 2 on the right side in the vehicle width direction, and a description will hereinafter be made on this side body structure 2 on the right side. However, the following description will also apply to the side body structure on the left side.

In this embodiment, the side body structure 2 includes: a door hinge 4 that is provided on a front side in the vehicle longitudinal direction of the side body structure 2; a front side door 5 that is attached to the side body structure 2 by the door hinge 4 and is located near a driver's seat or a front passenger's seat on the front side in the vehicle longitudinal direction; and a side sill reinforcement 6 that is provided to an outer end portion in the vehicle width direction of the floor panel 3, so as to oppose a lower portion of the front side door 5 from an inner side in the vehicle width direction of the front side door 5. The front side door 5 is configured to be openable/closable with an axis 7 of the door hinge 4, which extends vertically, being a center.

A crossmember 8 is attached to an upper surface of the floor panel 3 at a position opposing a substantially central portion in the vehicle longitudinal direction of the front side door 5. The crossmember 8 couples the right and left side sill reinforcements 6 to each other.

Figure 2:
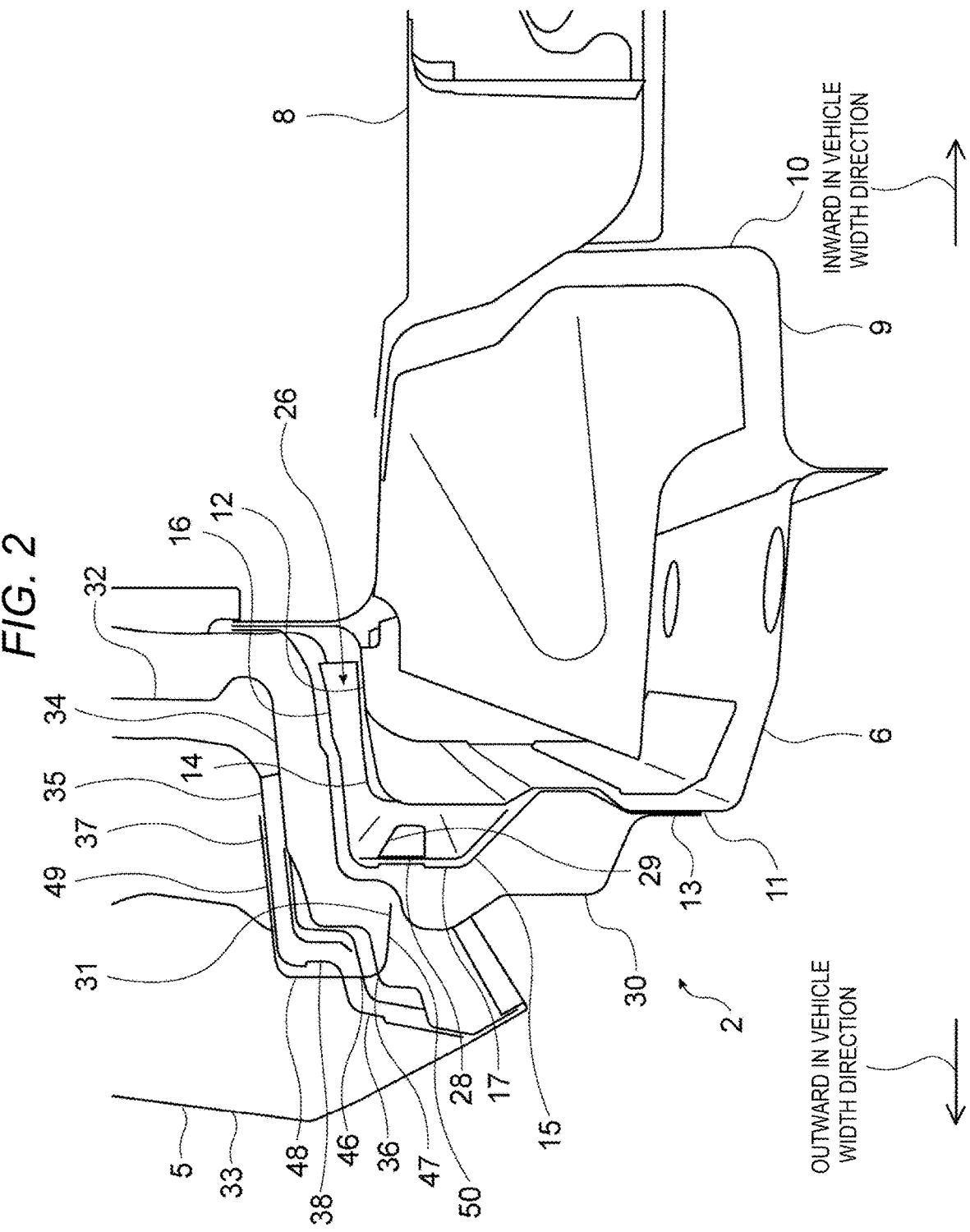
FIG. 2 is a cross-sectional view of a vehicle side body structure that is taken along a cross section II in FIG. 1.

FIG. 2 is a cross-sectional view of the vehicle side body structure 2 that is taken along a cross section II in FIG. 1.

[Side Sill Reinforcement]

As illustrated in FIG. 2, the side sill reinforcement 6 includes a substantially quadrilateral side sill reinforcement body 9 that is provided with a cavity therein. This side sill reinforcement body 9 has: an inner side sill 10 on the inner side in the vehicle width direction and has a hat-like cross sectional shape, an outer portion of which in the vehicle width direction is opened; an outer side sill 11 on the outer side in the vehicle width direction and has a hat-like cross sectional shape, an inner portion of which in the vehicle width direction is opened. The side sill reinforcement body 9 is formed by coupling upper ends and lower ends of these inner side sill 10 and outer side sill 11 by welding or the like.

The outer side sill 11 includes: an outer side sill upper surface 12 that substantially extends horizontally; and an outer side sill outer surface 13 that substantially extends downward in the vertical direction from an outer end portion in the vehicle width direction of the outer side sill upper surface 12. A coupled portion between the outer side sill upper surface 12 (a second engaged section) and the outer side sill outer surface 13 is a curved corner section 14.

In this embodiment, on the outer side in the vehicle width direction of the outer side sill 11, an engaged member 15 is attached in a manner to cover the curved corner section 14, the outer side sill upper surface 12, and the outer side sill outer surface 13 of the outer side sill 11 while keeping a clearance therefrom.

[Engaged Member]

Figure 3:
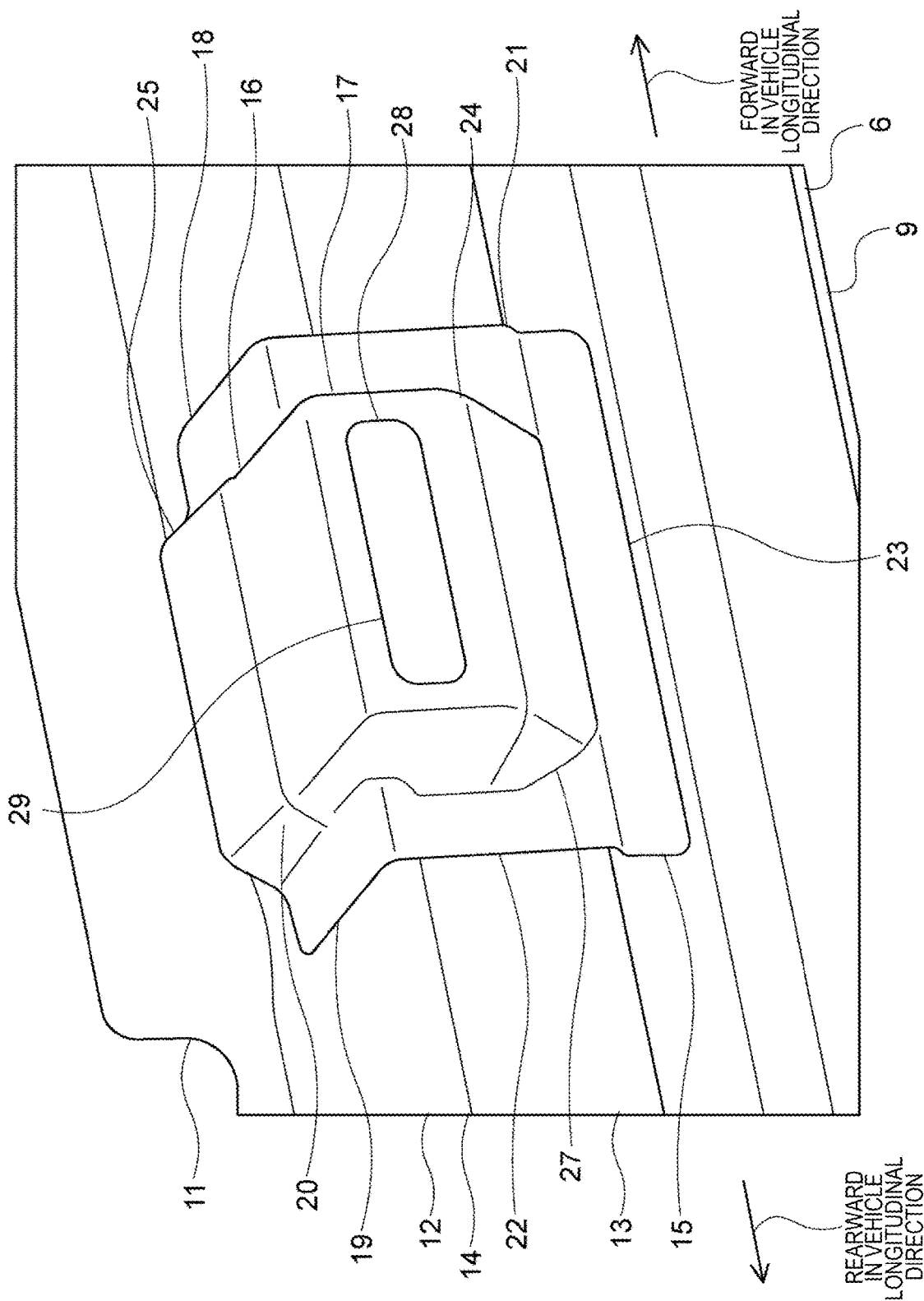
FIG. 3 is a perspective view of an engaged member illustrated in FIG. 2.

As illustrated in FIGS. 2 and 3, the engaged member 15 is substantially L-shaped, e.g., formed by processing a metal plate (for example, a steel plate with 1.0 mm thickness) to be substantially L-shaped. More specifically, the engaged member 15 has: a horizontal section 16 that extends substantially parallel to the outer side sill upper surface 12; and a vertical section 17 that extends substantially parallel to the outer side sill outer surface 13. As illustrated in detail in FIG. 3, the horizontal section 16 includes a front end portion 18 in the vehicle longitudinal direction, a rear end portion 19 in the vehicle longitudinal direction, and a central portion 20 located between these two portions 18, 19. The central portion 20 has a reinforcement cross section that bulges upward and has a hat shape when seen in the vehicle width direction. The vertical section 17 includes a front end portion 21 in the vehicle longitudinal direction, a rear end portion 22 in the vehicle longitudinal direction, a lower portion 23, and a central portion 24, three sides of which are surrounded by these three portions 21, 22, 23. The central portion 24 has a reinforcement cross section that bulges outward in the vehicle width direction and has a hat shape when seen from above. These reinforcement cross sections will hereinafter be referred to as a "reinforced section 25". The bulged shape of the central portion 20 in the horizontal section 16 and the bulged shape of the central portion 24 in the vertical section 17 are continuous, and form a substantially L-shaped space 26 (see FIG. 2) on the inside of the engaged member 15. The L-shaped space 26 continues in the vehicle width direction as a whole.

An opening 28 that is long and thin in the vehicle longitudinal direction is in the central portion 24 of the vertical section 17 in the engaged member 15.

In the thus-configured engaged member 15, the front end portion 18 and the rear end portion 19 of the horizontal section 16 are fixed to the outer side sill upper surface 12 by welding or the like, and the front end portion 21, the rear end portion 22, and the lower portion 23 of the vertical section 17 are fixed to the outer side sill outer surface 13 by welding or the like. A clearance or a space corresponding to the L-shaped space 26, which continuously extends from the outer side sill upper surface 12 to the outer side sill outer surface 13 via the curved corner section 14, is provided between the engaged member 15 and the side sill reinforcement 6. In addition, an upper end edge (the first engaged section) 29 of the opening 28, provided in the central portion 24 of the vertical section 17, opposes the vicinity of a horizontal apex (a part with the highest curvature) of the curved corner section 14. In this embodiment, the upper end edge 29 (the first engaged section) of the opening 28 and the outer side sill upper surface 12 (the second engaged section) constitute the "engaged means" together.

As described above, the engaged member 15 is attached to the outer side sill 11 such that the curved corner section 14, the outer side sill upper surface 12, and the outer side sill outer surface 13 of the outer side sill 11 are covered while keeping the clearance, i.e., being spaced, therefrom. Accordingly, an outer end portion in the vehicle width direction of the upper end edge 29 of the opening 28 is located on the outer side in the vehicle width direction of the outer end portion in the vehicle width direction of the outer side sill upper surface 12.

In this embodiment, as described above, the engaged member 15 is formed of the steel plate with the thickness of approximately 0.4 to 2.0 mm, preferably, approximately 1.0 mm, for example.

[Cover]

In the embodiment illustrated in FIG. 2, a blindfold cover 30 is arranged on the outer side of the engaged member 15 to cover the engaged member 15. As illustrated in FIG. 2, the cover 30 is supported by and fixed to the side sill reinforcement 6 while keeping a clearance from the engaged member 15. As will be described below, the cover 30 is formed from a relatively thin and soft material such that "engagement means" (an engagement member 31, which will be described below) provided to the front side door 5 can break through the cover 30 during a lateral collision.

In this embodiment, the cover 30 is formed of a steel plate with a thickness of approximately 0.4 to 2.0 mm, preferably, approximately 1.0 mm, for example.

[Front Side Door]

As illustrated in FIG. 2, the front side door 5 includes an inner panel 32 that is located on the inner side in the vehicle width direction and an outer panel 33 that is located on the outer side in the vehicle width direction. A bottom section 34 of the inner panel 32 is configured that, in a closed state of the front side door 5, the bottom section 34 opposes the outer side sill upper surface 12 and opposes the engaged member 15 while keeping a clearance therebetween. The bottom section 34 extends obliquely upward and inward in the vehicle width direction from a lower end of the outer panel 33, which opposes the vicinity of a lower end of the engaged member 15.

[Support Member]

Figure 4:
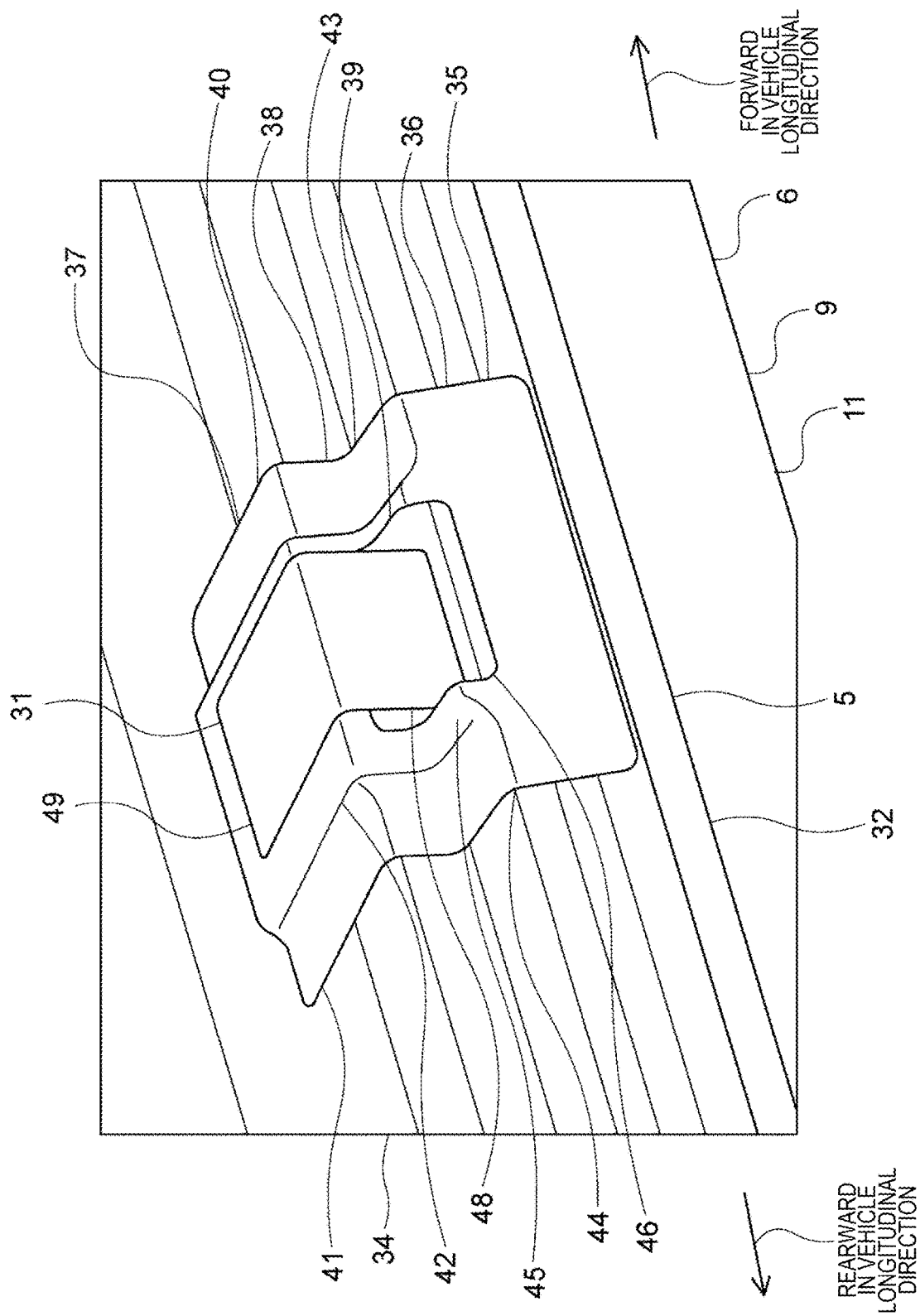
FIG. 4 is a perspective view of engagement means and a support member illustrated in FIG. 2.

As illustrated in FIG. 2, a support member 35 that supports the engagement means (the engagement member 31, which will be described below) is in a space between the inner panel 32 and the outer panel 33. As illustrated in FIG. 4, the support member 35 is fixed to an upper surface of the bottom section 34 of the inner panel 32. The support member 35 supports an engagement section or the engagement member 31 that cooperates with the side sill reinforcement 6 to prevent the front side door 5 from flipping during the lateral collision.

The support member 35 substantially L-shaped, e.g., may be formed by processing a metal plate (for example, a steel plate with 1.0 mm thickness) to be substantially L-shaped, for example. The support member 35 in the substantial L-shape includes: a vertical section 36 that extends substantially vertically; and a horizontal section 37 that extends substantially horizontally from an upper portion of the vertical section 36 toward the inner side in the vehicle width direction in a manner to oppose the bottom section 34 of the inner panel 32. The support member 35 is fixed to the bottom section 34 of the inner panel 32 by welding or the like.

At a corner of the support member 35 where the vertical section 36 and the horizontal section 37 intersect each other, a step section 38 is formed by bending a portion that constitutes the corner at an approximately right angle.

Similar to the above-described engaged member 15, the horizontal section 37 and the step section 38 of the support member 35 have a hat-shaped reinforced cross section (a reinforced section 39). More specifically, the horizontal section 37 includes a front end portion 40 in the vehicle longitudinal direction, a rear end portion 41 in the vehicle longitudinal direction, and a central portion 42 located between these two portions 40, 41. The central portion 42 has a reinforced cross section that bulges upward and has a hat shape. The step section 38 includes a front end portion 43 in the vehicle longitudinal direction, a rear end portion 44 in the vehicle longitudinal direction, and a central portion 45 located between these two portions 43, 44. The central portion 45 has a reinforced cross section that bulges upward and has a hat shape.

An opening 46 is provided in the central portion 45 of the step section 38. The opening 46 opposes the opening 28 of the above-described engaged member 15 and has substantially the same vehicle longitudinal length as the opening 28. As illustrated in FIG. 2, in a manner to correspond to the opening 46, an opening 47 is formed in the bottom section 34 of the inner panel 32 that supports the support member 35. The opening 47 is formed in a portion of the bottom section 34 that opposes the opening 46 of the support member 35, and has substantially the same vehicle longitudinal length as the opening 46. Accordingly, the three openings 28, 46, 47 are arranged in a line in the vehicle width direction and the substantially horizontal direction.

[Engagement Member]

As illustrated in FIG. 2, the engagement member 31 is a bracket or channel, e.g., formed by processing a metal plate (for example, a steel plate with 4.0 mm thickness) into a bracket shape or a channel shape. The engagement member 31 has: a web (the first portion) 48 that extends perpendicularly; and an upper flange (the third portion) 49 and a lower flange (the second portion) 50 that extend substantially in parallel with the substantially horizontal direction from an upper end and a lower end of the web 48, respectively, toward the inner side in the vehicle width direction. Accordingly, the web 48 extends to vertically couple an outer end portion in the vehicle width direction of the lower flange 50 and an outer end portion in the vehicle width direction of the upper flange 49. In the thus-configured engagement member 31, in a state where the lower flange 50 penetrates the opening 46 of the support member 35 and the opening 47 of the bottom section 34 of the inner panel 32 and is projected inward in the vehicle width direction from the bottom section 34 of the inner panel 32, the upper flange 49 is fixed to an upper surface of the horizontal section 37 of the support member 35 by welding or the like (see FIG. 4).

As will be described below, the thickness of the engagement member 31, in particular, a thickness of the lower flange 50 in the engagement member 31 may be determined such that a tip of the lower flange 50 can break through the cover 30 during the lateral collision.

[Operation]

Figure 6:
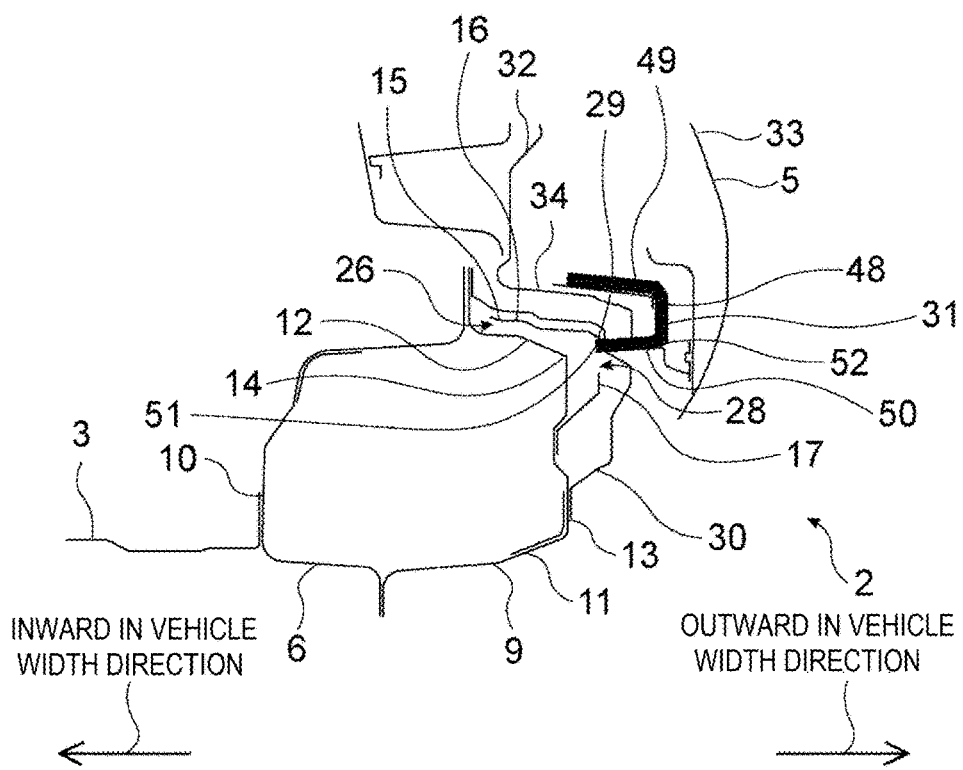
FIG. 6 is a schematic view for explaining a state at the time when the vehicle side body structure of FIG. 2 is deformed.
Figure 7:
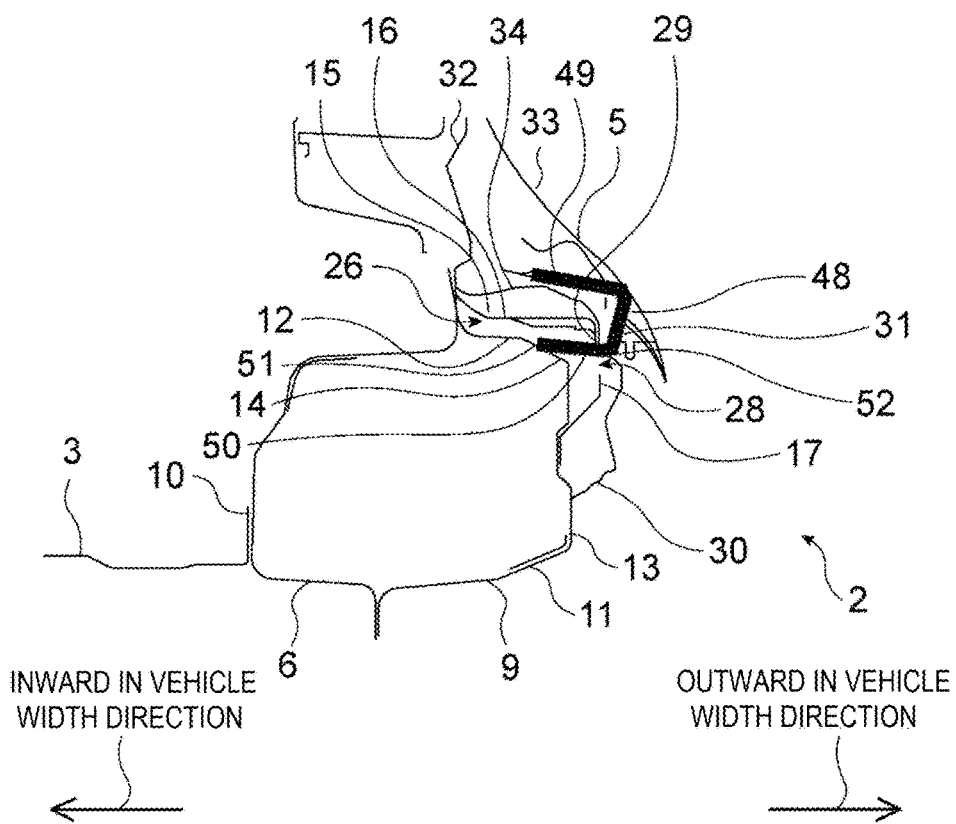
FIG. 7 is a schematic view for explaining the state at the time when the vehicle side body structure of FIG. 2 is deformed.

According to the body structure having such a configuration, in the case where the front side door 5 is subjected to a collision load from the outer side thereof, as illustrated in FIGS. 6 and 7, the outer panel 33 of the front side door 5 is deformed to the cabin side. The collision load that acts on the outer panel 33 is partially transmitted to the bottom section 34 of the inner panel 32. As a result, the bottom section 34 of the inner panel 32 is subjected to buckling deformation in the vehicle width direction. In this way, the support member 35, which is fixed to the bottom section 34 of the inner panel 32, and the engagement member 31, which is fixed to the support member 35, move to the cabin side by following the deformation of the bottom section 34. As a result, the lower flange 50 of the engagement member 31 breaks through the cover 30, which covers the side sill reinforcement 6, enters the space inside the engaged member 15 via the opening 28 thereof, and abuts the curved corner section 14 of the side sill reinforcement 6 or the vicinity thereof.

Thereafter, as the deformation of the inner panel 32 and the bottom section 34 further progresses, a tip portion 51 (the second engagement section) of the lower flange 50 moves beyond the curved corner section 14 of the outer side sill 11 while sliding on the outer side sill upper surface 12 (the second engaged section), and the web 48 of the engagement member 31 abuts the vertical section 17 of the engaged member 15.

Figure 5:
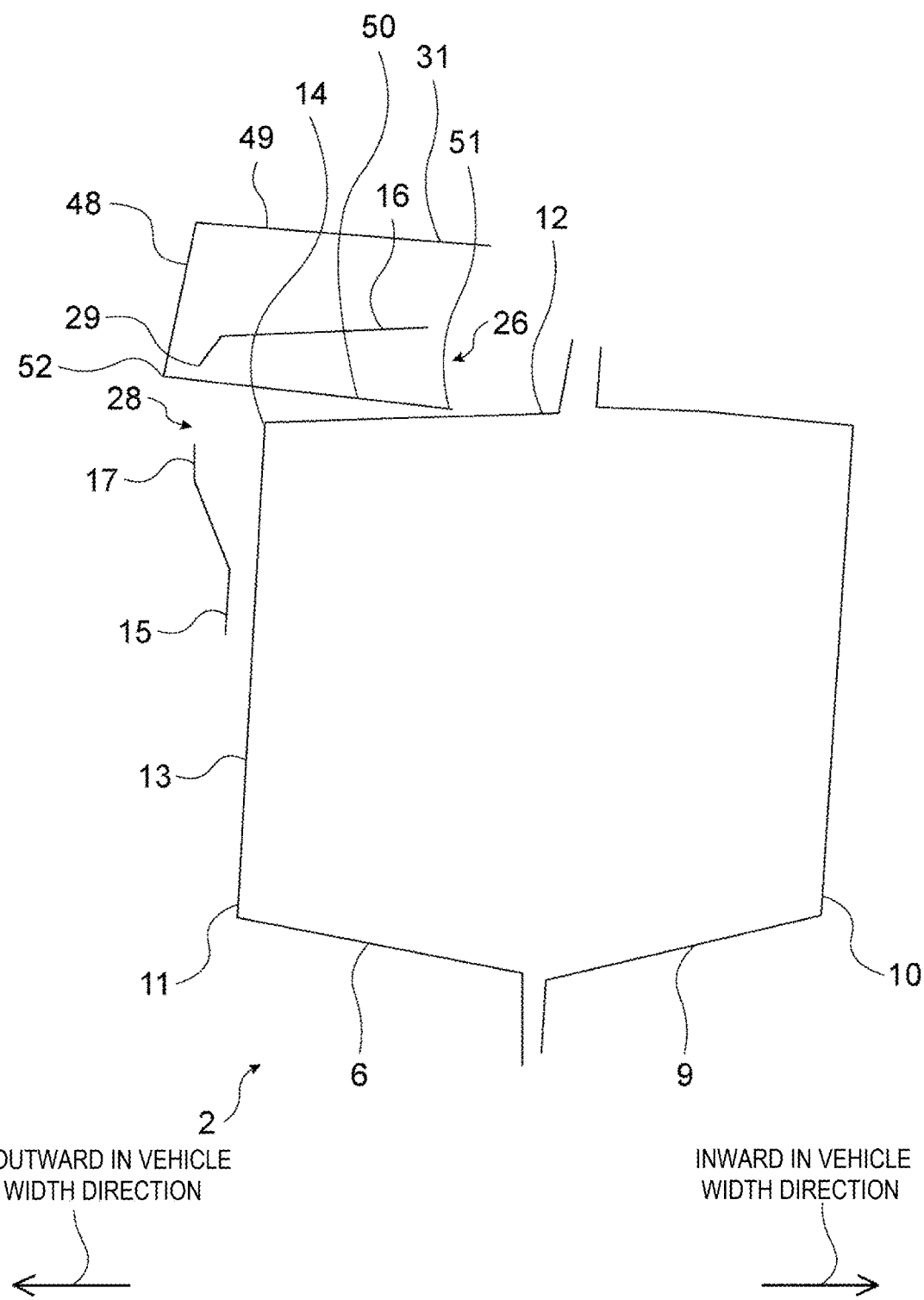
FIG. 5 is a schematic view at the time when the vehicle side body structure of FIG. 2 is deformed.

Next, as the deformation of the inner panel 32 and the bottom section 34 further progresses, the engagement member 31 rotates in conjunction with the deformation of those. For example, the engagement member 31 illustrated in FIG. 5 rotates clockwise. In this way, a lower corner of the engagement member 31 (that is, a coupled section 52 (the first engagement section) between the web 48 and the lower flange 50) engages with the upper end edge 29 (the first engaged section) of the opening 28 provided in the engaged member 15.

Figure 8:
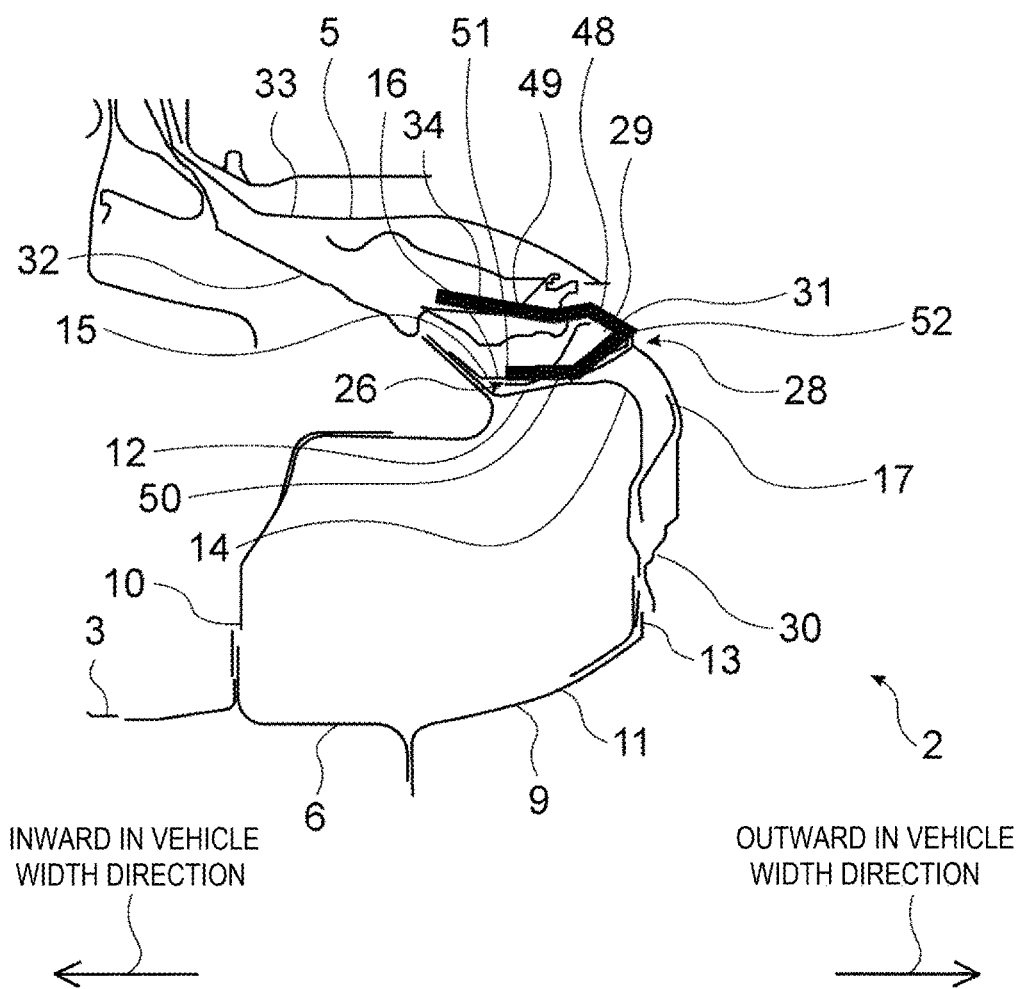
FIG. 8 is a schematic view for explaining the state at the time when the vehicle side body structure of FIG. 2 is deformed.

Next, as the deformation of the inner panel 32 and the bottom section 34 further progresses, as illustrated in FIG. 8, the coupled section 52 (the first engagement section) between the web 48 and the lower flange 50 engages with the upper end edge 29 (the first engaged section) of the opening 28. In addition, while the tip portion 51 (the second engagement section) of the lower flange 50 keeps abutting the outer side sill upper surface 12 (the second engaged section), the web 48 rotates and is bent with respect to the lower flange 50 with the coupled section 52 (the first engagement section) being a fulcrum. At this time, the web 48 rotates with respect to the lower flange 50 in a manner to reduce an angle (an inner angle) between the web 48 and the lower flange 50. Meanwhile, the upper flange 49 rotates with respect to the web 48 in a manner to increase an angle (an inner angle) between the upper flange 49 and the web 48. Just as described, since the angle between the web 48 and the lower flange 50 is reduced, the lower flange 50 gradually becomes difficult to be pulled out of the opening 28. As a result, during the deformation of the inner panel 32, the bottom section 34 of the inner panel 32 keeps being held by the side sill reinforcement 6 at all time, and flipping of the front side door 5 is thereby prevented.

OTHER EMBODIMENTS

The above-described embodiment is one mode of the invention. Thus, the disclosure is not limited to the above-described embodiment.

For example, the material for and the thickness of each of the engaged member 15, the cover 30, the engagement member 31, and the support member 35 can appropriately be selected as long as the above-described function can be implemented.

In the above-described embodiment, the engaged member 15 is fixed to the side sill reinforcement body 9, and the upper end edge 29 of the opening 28 of the engaged member 15 and the upper surface 12 of the outer side sill 11 are respectively set as the first engaged section and the second engaged section. However, components that respectively correspond to these first engaged section and second engaged section may be provided to the side sill reinforcement body 9.

In the above-described embodiment, the engagement member 31 is formed to have the bracket shape or the channel shape, and the coupled section 52 between the web 48 and the lower flange 50 and the tip portion 51 of the lower flange 50 are respectively set as the first coupled section and the second coupled section. However, these first coupled section and second coupled section may directly be formed in the side door by processing a part of the side door.

In order to further prevent the front side door 5 from flipping, in addition to the above-described body structure, a configuration, which will be described below, may be adopted for the body structure.

Figure 9:
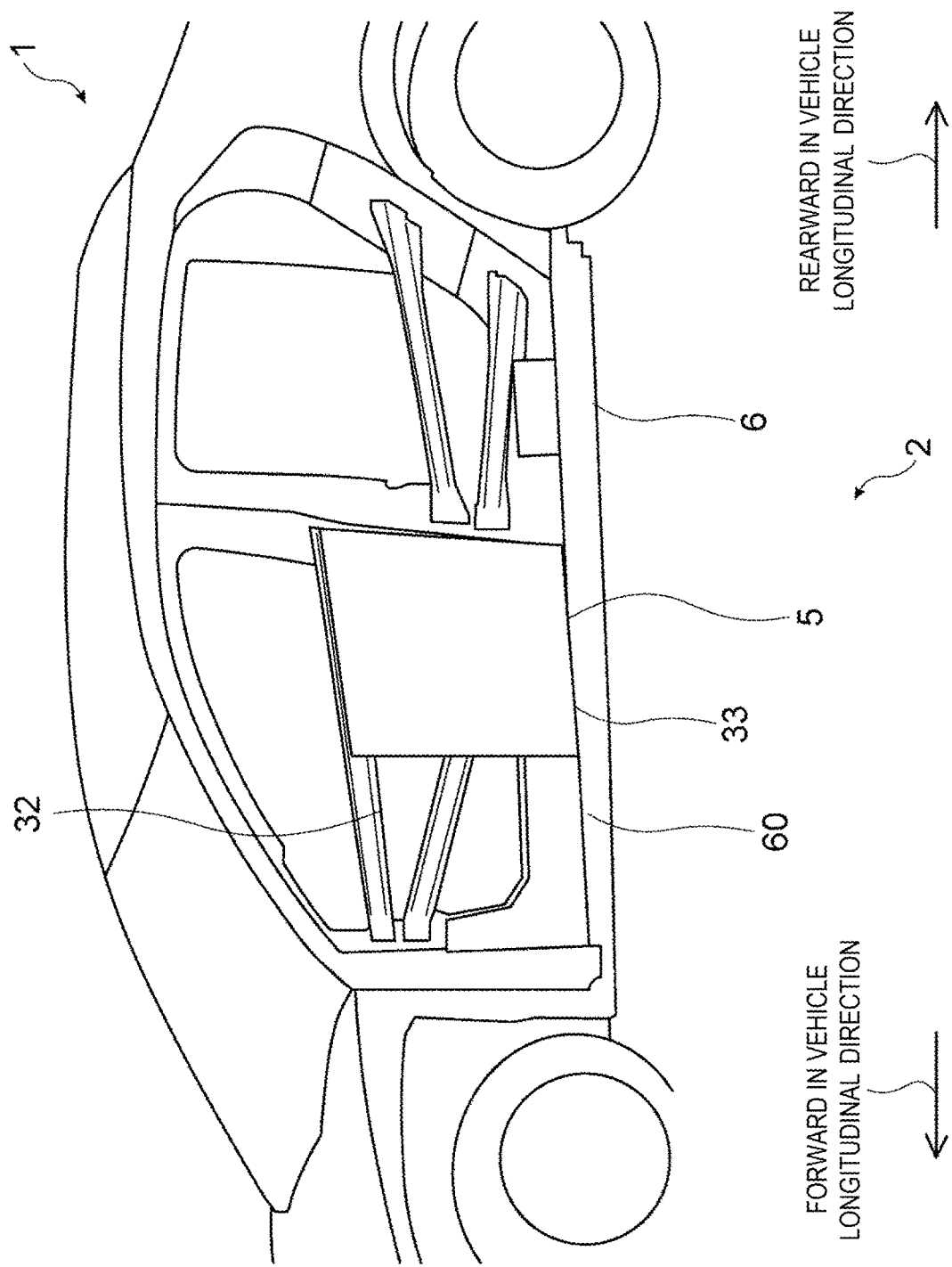
FIG. 9 is a side view illustrating a structure of a side door illustrated in FIG. 2.

For example, as illustrated in FIG. 9, a side door reinforced section 60, which is formed by processing a metal plate (for example, a steel plate with 1.0 mm thickness) to be substantially L-shaped, may be arranged between lower portions of the inner panel 32 and the outer panel 33 of the front side door 5. This side door reinforced section 60 may be fixed to the inner panel 32, for example.

Figure 10:
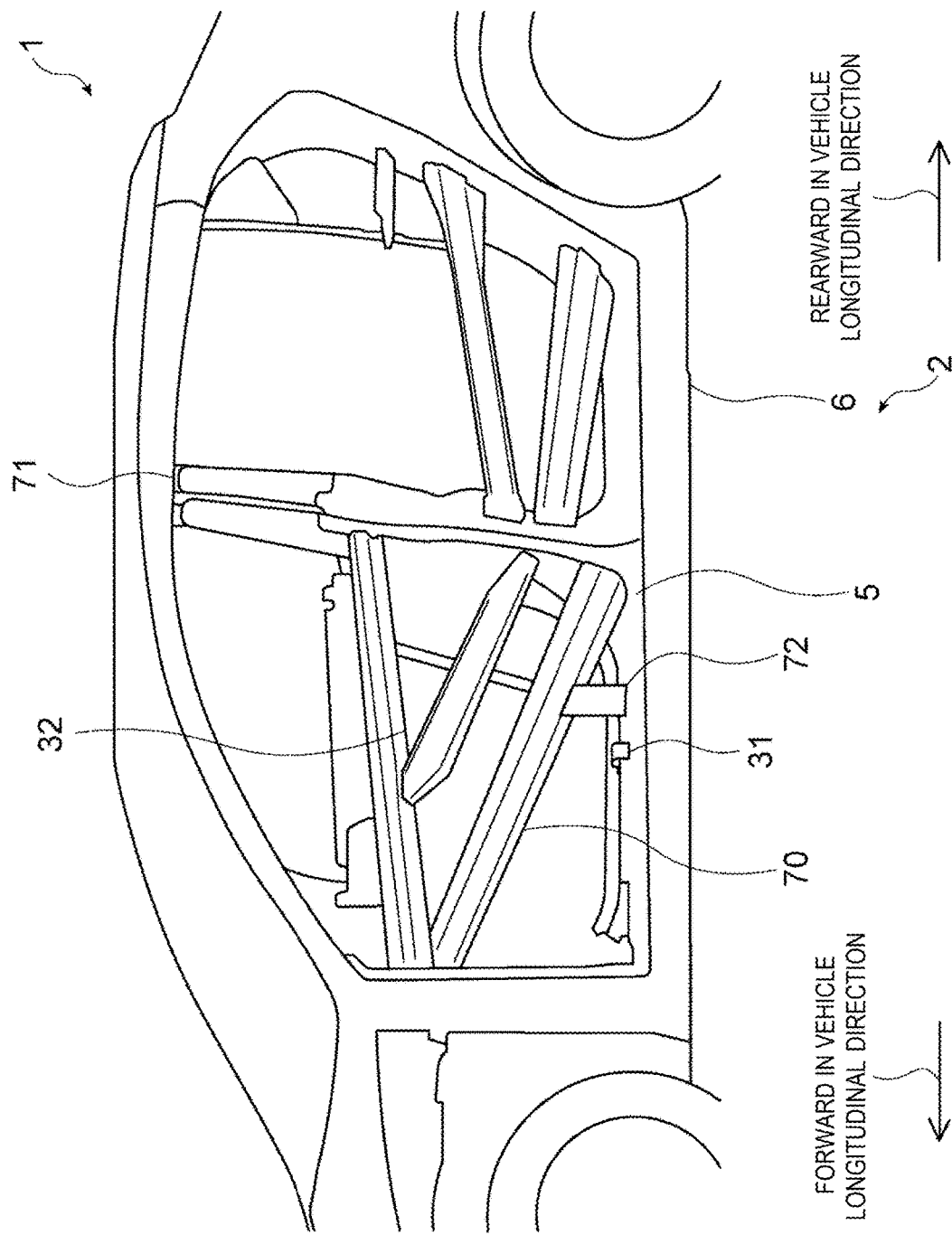
FIG. 10 is a side view illustrating the structure of the side door illustrated in FIG. 2.

As illustrated in FIG. 10, at a position between the inner panel 32 and the outer panel 33 of the front side door 5 and above the engagement member 31, an impact bar 70, e.g., a bar formed by processing a metal plate (for example, a steel plate with 1.0 mm thickness), may be fixed to the inner panel 32, for example, in a manner to be inclined downward from the front side in the vehicle longitudinal direction toward the rear side in the vehicle longitudinal direction.

In the case where the side body structure 2 includes a B pillar 71 on the rear side in the vehicle longitudinal direction of the side body structure 2, a coupling reinforced member 72, e.g., a member formed by processing a metal plate (for example, a steel plate with 1.0 mm thickness), may be fixed to the inner panel 32 at a position between the engagement member 31 and the B pillar 71, so as to vertically couple a lower end of the impact bar 70 and the lower portion of the front side door 5.

The engagement member 31 may be located in the substantially central portion in the vehicle longitudinal direction of the front side door 5. In this case, as described above, when the collision load acts on the front side door 5 from the outer side thereof, and the engagement member 31 is about to move to the cabin side by following the inner panel 32, the crossmember 8 can resist against the movement of the engagement member 31 and the bottom section 34 of the inner panel 32 to the cabin side.

With the above-described configuration, the front side door 5 is less likely to be deformed easily. Thus, the side body structure 2 can further prevent the front side door 5 from flipping.

In the above-described embodiment, the engaged member 15 is formed such that the central portion 20 of the horizontal section 16 bulges upward. However, the engaged member 15 may be formed such that the central portion 20 bulges downward, for example. Similarly, in the above-described embodiment, the support member 35 is formed such that the central portion 42 of the horizontal section 37 bulges upward. However, the support member 35 may be formed such that the central portion 42 bulges downward, for example.

The description has been made so far on the embodiment applied to the door located near the driver's seat or the front passenger seat. However, the embodiments can also be applied similarly to a door that is located near a rear passenger seat. In addition, the embodiments can be applied widely to doors of other vehicles in addition to the door that is mounted on the automobile.

No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure. The scope of the invention is indicated by the appended claims, rather than the foregoing description.

DESCRIPTION OF REFERENCE SIGNS AND NUMERALS

2 Side body structure
5 Front side door
6 Side sill reinforcement
12 Second engaged section (outer side sill upper surface)
15 Engaged member
26 Clearance (space)
29 First engaged section (upper end edge)
31 Engagement member
51 Second engagement section (tip portion)
52 First engagement section (coupled section)

The invention claimed is:

1. A vehicle side body structure comprising:
a side door; and
a side sill reinforcement that is provided on an inner side in a vehicle width direction of the side door and opposes a lower portion of the side door, wherein
the side sill reinforcement includes an engaged structure having:
  a first engaged section that extends in a vehicle longitudinal direction; and
  a second engaged section at a distance from the first engaged section in a vertical direction and on an inner side in the vehicle width direction of the first engaged section with a clearance being provided from the first engaged section, and
the side door includes
an engagement structure
having a first engagement section and a second engagement section on an outer side in the vehicle width direction of the side sill reinforcement, the first engagement section and the second engagement section extending in a closed state of the side door and existing away from each other on an outer side in the vehicle width direction and the inner side in the vehicle width direction, respectively, wherein
the engagement structure includes:
  a second portion that extends in the vehicle width direction and includes the second engagement section on the inner side in the vehicle width direction,
  a first portion that extends upward from an outer end portion in the vehicle width direction of the second portion and cooperates with the second portion to form the first engagement section on a boundary between the first portion and the second portion, and
  a third portion that is integrally coupled to an upper end of the first portion and extends inward in the vehicle width direction from the upper end of the first portion, the first, second, and third portions thereby forming a channel shape, wherein
the distance in the vertical direction between the first engaged section and the second engaged section is configured to allow the second engagement section to enter therein into the clearance, and
the engagement structure is bent with the first engagement section as a fulcrum such that an inner angle between the first portion and the second portion is reduced to resist the second portion from being pulled out of the clearance.

2. The vehicle side body structure according to claim 1, wherein
an outer end portion in the vehicle width direction of the first engaged section is located on the outer side in the vehicle width direction of an outer end portion in the vehicle width direction of the second engaged section.

3. The vehicle side body structure according to claim 1, wherein
the side sill reinforcement has a side sill reinforcement body and an engaged member that is fixed onto the side sill reinforcement body,
the engaged member forms the first engaged section, and an upper surface of the side sill reinforcement body forms the second engaged section.

4. The vehicle side body structure according to claim 3, wherein
the side door includes a bottom surface that opposes the upper surface of the side sill reinforcement body, and
the engagement structure is fixed to the bottom surface of the side door.

5. The vehicle side body structure according to claim 4, wherein
the engagement structure further includes:
a support member fixed to the side door,
the support member includes a support member upper surface that opposes the bottom surface of the side door, and
the third portion is fixed to the support member upper surface of the support member.

6. The vehicle side body structure according to claim 5, wherein
the support member includes a support member reinforced section that is curved or bent upward or downward when seen in the vehicle width direction.

7. The vehicle side body structure according to claim 4, wherein
a coupled section between the upper surface and an outer surface of the side sill reinforcement body is provided with a curved corner section that is curved downward from the upper surface toward the outer surface, and
an inner end portion in the vehicle width direction of the second portion of the engagement structure is configured to be guided to the inner side in the vehicle width direction along the upper surface of the side sill reinforcement body while contacting the curved corner section during deformation of the side door.

8. The vehicle side body structure according to claim 4, wherein
the engaged member includes a front end portion and a rear end portion in the vehicle longitudinal direction, and
the front end portion and the rear end portion are fixed to one of or both of the upper surface and an outer surface of the side sill reinforcement body.

9. The vehicle side body structure according to claim 8, wherein
the engaged member includes an engaged member reinforced section that is curved or bent upward or downward when seen in the vehicle width direction.

10. The vehicle side body structure according to claim 3, wherein
the side sill reinforcement body prevents the engagement structure from being pulled out of the clearance during deformation of the side door.

11. The vehicle side body structure according to claim 1, wherein
a side door reinforced section is attached to the lower portion within the side door.

12. The vehicle side body structure according to claim 1, wherein
a B pillar is behind the side door in the vehicle longitudinal direction, an impact bar is above the engagement structure and is inclined downward from front toward rear in the vehicle longitudinal direction, the impact bar being attached to the side door from the outer side in the vehicle width direction, and a coupling reinforced member that couples the impact bar and the lower portion of the side door vertically is attached from the outer side in the vehicle width direction at a position between the engagement structure and the B pillar.

13. The vehicle side body structure according to claim 12, wherein a crossmember is attached to a lower portion of the vehicle, the crossmember extending inward in the vehicle width direction from the side sill reinforcement at a center in the vehicle longitudinal direction of the side door, and the engagement structure is between the crossmember and the B pillar in the vehicle longitudinal direction.

14. The vehicle side body structure according to claim 1, wherein the side sill reinforcement includes a cover that covers the engaged structure, and the engagement structure breaks through the cover during deformation of the side door.

15. The vehicle side body structure according to claim 14, wherein in a closed state of the side door, the engagement structure is spaced apart from the cover toward an outer side in the vehicle width direction when the side door is not deformed.

16. The vehicle side body structure according to claim 5, wherein the engagement structure is formed from a single metal plate processed into a bracket or a channel shape.

17. The vehicle side body structure according to claim 1, wherein the engagement of the first engagement section of the side door with the first engaged section of the side sill reinforcement creates a fulcrum for the bending of the engagement structure.

18. The vehicle side body structure according to claim 3, wherein the side sill reinforcement body has a rigidity that prevents the engagement structure from being pulled out of the clearance when the engagement structure is bent.

19. The vehicle side body structure according to claim 3, wherein the engaged member is substantially L-shaped and includes a horizontal section fixed to the upper surface of the side sill reinforcement body and a vertical section fixed to an outer surface of the side sill reinforcement body.

20. The vehicle side body structure according to claim 3, wherein the first engaged section of the side sill reinforcement includes an upper end edge of an opening located in the engaged member.

* * * * *